United States Patent Office 3,198,046
Patented Aug. 3, 1965

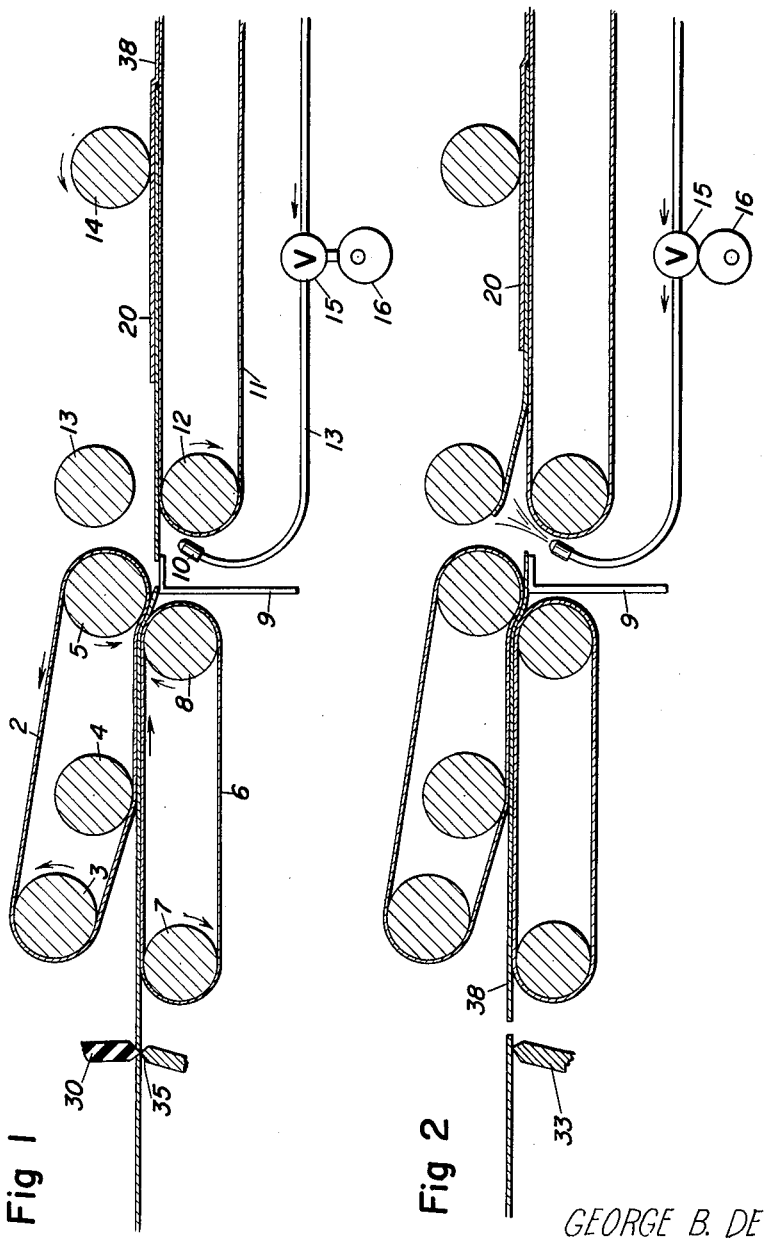

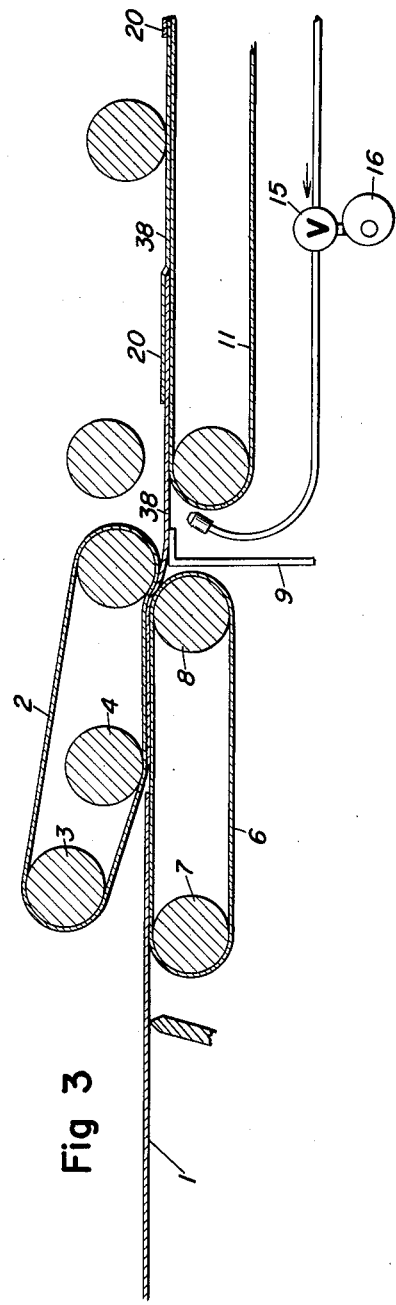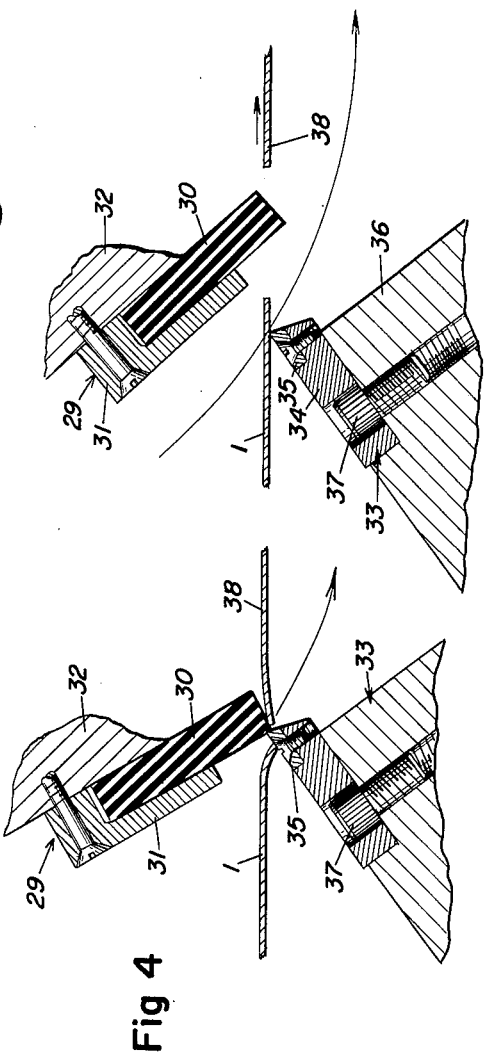

3,198,046
METHOD AND APPARATUS FOR HANDLING SHEETS CUT FROM A WEB
George B. De Angelo, Lee, Mass., assignor to The Clark-Aiken Company, Lee, Mass., a corporation of Massachusetts
Filed Feb. 20, 1963, Ser. No. 259,867
6 Claims. (Cl. 83—24)

This invention relates to a process and apparatus for cutting a traveling web and assembling the severed sheets on a moving conveyor. More specifically the present invention is directed to a method and device for cutting a traveling web and transferring the individual lengths so that an assembly of underlapping sheets in echelon is formed for delivery to a stacking mechanism.

In the past, considerable difficulty has been experienced in continuously cutting and assembling the paper sheets from a moving web. A number of ways for continuously cutting and preparing severed sheets for delivery to a stacker have been devised but many of these developments have proved cumbersome and impractical. The usual procedure is to cut the web with a rotary cutter and transfer the lengths from the cutter to a conveyor in overlapping relationship. Some machines use air jets to insure clearance of the several lengths from the cutting area thus preventing the sheets from adhering to the cutting cylinder.

Most of the machines for cutting and assembling sheets are designed to superimpose the forward edges of the sheets over the trailing portion of the preceding sheets in a random fashion. Past experience has shown that when the individual sheets are cut off from a rapidly moving web, there is a tendency for the sheets to become unevenly spaced with respect to one another. Sometimes the forward edge of one sheet will curl against the trailing edge of its predecessor to cause bunching and choking with attending shut downs and loss of time and material. This difficulty is often encountered when handling thin paper sheets. A further difficulty experienced with machines that overlap the severed sheets is that successive sheets when fed in overlapping relationship will tend to become unevenly spaced. Also an endless conveyor cannot properly pick up the sheets being fed when much of the forward portions of the feeding sheets are superimposed over the advance sheets.

It has been found that the above difficulties can be overcome by cutting the moving web, spacing the freshly cut sheets apart and thereafter passing the sheets within the reach of a conveyor for assembly. Assembly is accomplished by inserting the leading edge of the following sheets below the trailing edge of the leading sheets in direct contact with the conveying means so that an evenly spaced echelon of underlapped sheets is assembled on the conveying means.

It is an object of the present invention to provide means for cutting a moving web and assembling the severed sheets in precise alignment, and in underlapping relationship on a conveying means.

The above and other objects will be apparent from the following description and drawings:

FIGURE 1 is a sectional view showing the conveying system and the relative positions of the web and sheets at the time the web is cut;

FIGURE 2 is a similar view of the same system shortly after the web has been cut showing the trailing edge of a transferred sheet being deflected;

FIGURE 3 is a similar view of the same system showing a transferring sheet underlapped with respect to a transferred sheet;

FIGURE 4 is a sectional view of the rotating knife and the bed knife impact cutting of the web; and FIGURE 5 is a similar view showing the relative positions of the knives after the web has been cut.

FIGURES 1–3 illustrate in sequence the cutting and assembling steps of the present invention. Referring to FIGURE 1, a moving web 1 is continuously fed between knives 30 and 35 which severs the web at predetermined lengths forming individual sheets 38. As each sheet is severed it is drawn between endless conveyors 2 and 6 and fed across a gap passing over an L-shaped guide bar 9 to the reach of conveyor 11. Conveyors 2 and 6 are impelled and guided by rollers 3, 4, 5, 7 and 8 which are preferably driven at a relatively higher speed than the web so that the individual sheets are spaced apart. The relative speeds of the freshly severed sheets and the web can vary widely but a difference of about 10% is appropriate. Other ways of creating gaps between the sheets are believed to be obvious.

Referring now to FIGURE 2, as the trailing edge of sheet 38 passes over guide bar 9 but before the leading edge of the next sheet projects over the bar, a blast of air is released from a pneumatic device such as air pipe 17 terminating in nozzle 10, to lift the trailing edge above the conveyor. The air blast occurs when valve 15 is opened and actuated by rotating cam 16. The periodic opening and shutting movements of the valve are synchronized with the movements of the knife cylinder by conventional means.

The deflecting means raises the trailing edge of sheet 38 against the deflector roll 13 while the forward movement of the sheet is retarded by underlap roll 14. Immediately following the air blast and while the trailing edges of each sheet are deflected, the leading edges of the succeeding sheets are urged under the deflected portions of the sheets so that a series of underlaps occur and the sheets are assembled on the conveyor and moved away on an endless conveyor 11 (shown only in part with roll 12).

As illustrated in FIGURES 4 and 5 the rotating knife assembly 29 includes blade knife holder or clamp for securing knife 30 to rotating cylinder 32 (shown in part). The stationary bed knife assembly 33 includes bed knife holder 34 and knife 35 adjustably secured to fixed support 36 (shown in part) by bolt 37. In accordance with usual practice the web 1 is severed by rotary web or impact cutting. Although it is possible to use steel knives, that is conventional steel fly and steel bed knives, certain materials can be more cleanly cut if knife 30 which is a hard rubber insert clamped to cylinder 32 while the stationary bed knife insert is preferably composed of high speed steel.

Referring to FIGURE 4 it will be apparent that knife 30 projects outwardly and transversely from the cylinder so that its outer edge contacts knife 35 sufficiently to sever the web as the cylinder is rotated counter-clockwise and in the direction of web travel. The web is severed into a plurality of individual sheets 38 that are picked up by endless conveyor 2 for assembling. As shown in FIGURE 5, knife 30 continues to rotate behind sheet 38 and knife 35 remains as a stationary support for the travelling web.

It will be evident that various changes and modifications can be made to the above decribed process and device without departing from the spirit of the invention. For instance various deflecting, arresting and conveying means can be substituted for the specific features named herein. However it is to be understood that the invention is to be limited only in terms of the appended claims.

I claim:
1. A process for assembling sheets comprising passing a web through cutting means to obtain a plurality of sheets, separating said sheets by conveying them away from said cutting means at a higher rate of speed than that of said web and assembling said sheets in underlapping relationship by passing the separated sheets across a gap and over a bar positioned within the gap to a conveyor, arresting the forward movement of one of said sheets and deflecting only the trailing edge of said sheet by a blast of air while urging the forward edge of the next succeeding sheet across the gap and over the bar so that the forward edges of succeeding sheets are fed under said trailing edge to form an assembly of spaced sheets in underlapped echelon on said conveyor.

2. A process for assembling paper sheets comprising passing a web through cutting means to obtain a plurality of sheets, conveying said sheets at a speed higher than said web speed to separate said sheets, transferring the individual sheets across a gap to a second conveyor means for assembling, the assembling of the sheets being accomplished by simultaneously deflecting only the trailing edges by a blast of air and arresting the forward movement of said sheets while urging the forward edge of a succeeding sheet across the gap under the trailing edge of a preceding sheet to form an assembly of underlapping sheets in underlapping echelon on said second conveying means.

3. A device for cutting a moving web and assembling the severed sheets comprising a cutting means operatively positioned on a web, said cutting means being followed by conveying means for receiving and feeding severed sheets to a second conveying means, said first-named conveying means comprising opposing endless conveyors and said second conveying means comprising a single endless conveyor said second conveying means being spaced from said first conveying means, a deflector roll, means positioned between said conveying means for deflecting the trailing edges of each of said sheets away from said second conveying means against said deflector roll and an underlap roll positioned above said second conveying means for simultaneously arresting the forward movement of said sheets.

4. The device of claim 3 wherein the deflecting means comprises a pneumatic device.

5. A device for cutting a moving web and assembling the severed sheets comprising a cutting means operatively positioned on a web, said cutting means being followed by conveying means for receiving and feeding severed sheets to a second conveying means, said second conveying means being spaced from said first conveying means, a bar positioned between said first-named conveying means and said second conveying means, a deflector roll positioned above the forward part of said second conveying means, a pneumatic device positioned between said bar and said second conveying means for deflecting the trailing edge of each of said sheets away from said second conveying means against said deflector roll and underlap roller means for simultaneously arresting the forward movement each of said sheets when the same is deflected.

6. The device of claim 5 wherein the bar is an L-shaped guide which receives the forward edges of each of said sheets and causes them to move adjacent the pneumatic means.

References Cited by the Examiner

UNITED STATES PATENTS

| | | | |
|---|---|---|---|
| 1,148,337 | 7/15 | Schmidt | 83—659 |
| 1,501,919 | 7/24 | Peters | 83—659 |
| 1,601,335 | 9/26 | Addison | 83—659 |
| 1,986,023 | 1/35 | Staude | 271—76 |
| 2,151,136 | 3/39 | Moffitt | 83—24 |
| 2,261,970 | 11/41 | Matthews | 271—74 |
| 2,261,972 | 11/41 | Matthews | 83—88 |
| 2,632,510 | 3/53 | Doppleb | 83—88 |

FOREIGN PATENTS

| | | |
|---|---|---|
| 589,283 | 12/59 | Canada. |
| 1,175,215 | 11/58 | France. |
| 21,876 | 9/61 | Germany. |

ANDREW R. JUHASZ, *Primary Examiner.*